US011865848B2

(12) United States Patent
Taff et al.

(10) Patent No.: US 11,865,848 B2
(45) **Date of Patent: *Jan. 9, 2024**

(54) PRINT MATERIAL FEED SYSTEM

(71) Applicant: Kateeva, Inc., Newark, CA (US)

(72) Inventors: Robert Dennis Taff, San Ramon, CA (US); Alexander Sou-Kang Ko, Santa Clara, CA (US); Stephen Mark Smith, Morgan Hill, CA (US); Geoffrey Kenneth Love, Lafayette, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,679

(22) Filed: Apr. 19, 2022

(65) Prior Publication Data

US 2022/0242137 A1 Aug. 4, 2022

Related U.S. Application Data

(63) Continuation of application No. 16/717,756, filed on Dec. 17, 2019, now Pat. No. 11,338,588.

(60) Provisional application No. 62/782,412, filed on Dec. 20, 2018.

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01)

(58) Field of Classification Search
CPC ...... B41J 2/16532; B41J 2/04501; B41J 2/18; B41J 2/17596
See application file for complete search history.

(56) References Cited

U.S. PATENT DOCUMENTS

| | | | |
|---|---|---|---|
| 4,460,904 A | 7/1984 | Oszczakiewicz et al. | |
| 11,338,588 B2 * | 5/2022 | Taff | B41J 2/175 |
| 2002/0148775 A1 | 10/2002 | Watari et al. | |
| 2005/0215664 A1 | 9/2005 | Elwakil et al. | |
| 2010/0039486 A1 | 2/2010 | Wouters et al. | |
| 2010/0104759 A1 | 4/2010 | Bitterich et al. | |
| 2011/0285768 A1 | 10/2011 | Preckel | |
| 2014/0300670 A1 | 10/2014 | Tsukamoto | |

OTHER PUBLICATIONS

International Search Report and Written Opinion dated Apr. 7, 2020 to PCT/US2019/067140, filed on Dec. 19, 2019.
Notice of Allowance dated Apr. 15, 2022 in U.S. Appl. No. 16/717,756.
Final Office Action dated Dec. 21, 2021 in U.S. Appl. No. 16/717,756.
Non-Final Office Action dated May 25, 2021 in U.S. Appl. No. 16/717,756.

* cited by examiner

*Primary Examiner* — Thinh H Nguyen
(74) *Attorney, Agent, or Firm* — Hauptman Ham, LLP

(57) ABSTRACT

An inkjet printer has a print assembly and a print material feed system comprising a first circulation circuit and a second circulation circuit, the first circulation circuit fluidly coupled between the second circulation circuit and the print assembly.

19 Claims, 7 Drawing Sheets

PRINT MATERIAL FEED SYSTEM

CROSS-REFERENCE TO RELATED APPLICATIONS

This is a continuation application of copending U.S. patent application Ser. No. 16/717,756, filed Dec. 17, 2019, which claims benefit of U.S. Provisional Patent Application Ser. No. 62/782,412 filed Dec. 20, 2018, each of which is incorporated herein by reference.

BACKGROUND

Inkjet printing of digital display substrates involves depositing volumes of material on a substrate at predetermined positions. The material is ejected from a dispenser in controlled volumes, travels through a gap between the dispenser and the substrate, landing on the substrate at a target location. The print materials used can be complex mixtures of reactive chemicals, solvents, and solids. Consistent delivery of print material to various locations on the substrate depends on maintaining consistent composition of material delivered to the different locations of the substrate. There is a need in the art of inkjet printing for a printer with a material delivery system that can maintain print material in a well-mixed and dispersed state while delivering controlled volumes of print material to the printer at specific times.

SUMMARY

Embodiments described herein provide an inkjet printing device, comprising a print assembly; and a print material feed system coupled to the print assembly, the print material feed system comprising a first circulation circuit and a second circulation circuit, the first circulation circuit fluidly coupled between the second circulation circuit and the print assembly.

Other embodiments described herein provide a print material feed system, comprising a first circulation circuit, which comprises a print material supply reservoir; a print material drain reservoir; at least one printhead; a print material supply line fluidly coupled from the print material supply reservoir to the at least one printhead; a print material return line fluidly coupled from the at least one printhead to the print material drain reservoir; and a second circulation circuit, which comprises a circulation supply line coupled to the print material supply reservoir; a circulation return line coupled to the print material drain reservoir; and a pump with a suction fluidly coupled to the circulation return line and a discharge fluidly coupled to the circulation supply line.

Other embodiments described herein provide an inkjet printing device having a print material feed system, comprising a print assembly; a bulk circulation circuit; a middle circulation circuit; and a local circulation circuit, wherein the bulk circulation circuit is configured to draw print material from a supply vessel into a mixing vessel and to flow print material around the bulk circulation circuit continuously, the middle circulation circuit is configured to draw print material from the bulk circulation circuit, and to flow print material from and back to the local circulation circuit, and the local circulation circuit is configured to draw print material from and to return print material to the middle circulation circuit, and to supply print material to the print assembly.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
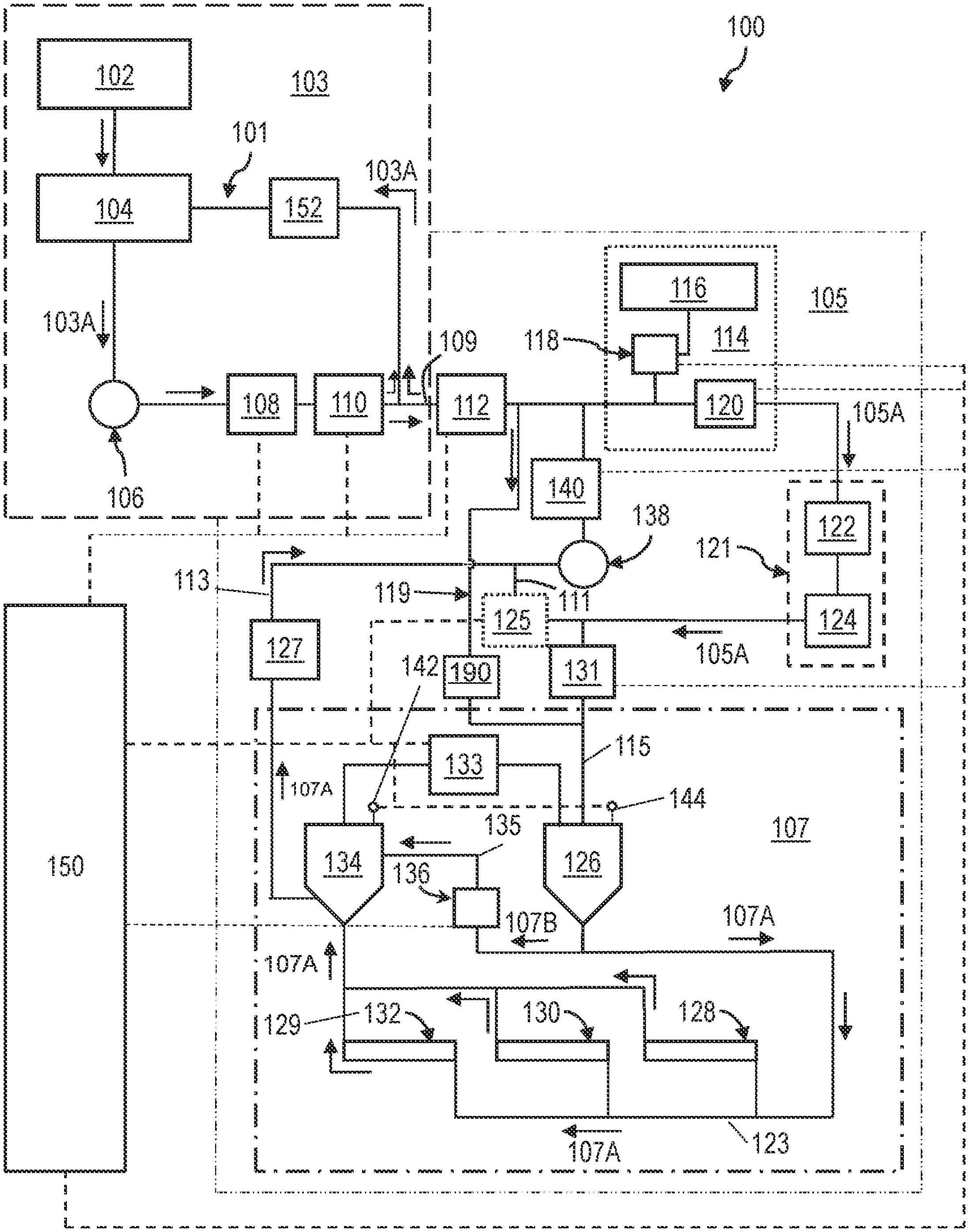
FIG. 1 is a schematic diagram of a print material feed system of an inkjet printing device, according to one embodiment.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some inkjet printing applications, print material is deposited in discrete volumes on a substrate. The volumes are typically deposited as uniformly as possible so that the resulting structure complies with manufacturing parameters. An example of such an application is inkjet printing of display elements on a substrate. If the display elements are printed non-uniformly, the display may not have uniform light emission.

To deposit uniform volumes of print material on a substrate, parameters of the inkjet printing process are regulated. In some cases, the discrete volumes of print material have dimensions as small as 10 μm. The regulated parameters of the inkjet printing process can include positioning of the print substrate, movement of the print substrate, separation distance or printing gap between a printhead and a top surface of the print substrate, temperature of the components of an inkjet printing device and the print substrate, and composition of the print material being deposited on the print substrate.

Print material frequently includes a combination of fluids and suspended particles. The fluid can be a mixture of monomers that are ultimately cured, either by thermal or photo curing, into a hard material that adheres to the print substrate. The fluid can also include cross-linking monomers that connect two or more polymer chains within the cured print material, providing greater structural strength and/or rigidity to the cured material. Solvents can also be used to regulate surface tension, density, and/or viscosity of the print material for repeatable droplet formation.

Print material can also have insoluble elements such as scattering particles and quantum dots. Scattering particles are small reflective particles that, when embedded within a cured material, scatter incident light from a light source. Quantum dots absorb light of one wavelength and consequently emit light of another wavelength, according to characteristics of the quantum dots. Maintaining good dispersion of scattering particles and quantum dots in a print material improves uniformity of light output by a display made using a print material containing scattering particles and quantum dots. One technique of maintaining a dispersed print material is to agitate or mix the print material prior to deposition of the print material on the print substrate. Another technique is to keep the print material in motion between deposition instances.

FIG. 1 is a schematic diagram of a print material feed system 100 of an inkjet printing device, in accordance with some embodiments. The print material feed system 100 includes at least two circulation circuits, here including a bulk circulation circuit 103, a middle circulation circuit 105, and a local circulation circuit 107. The bulk circulation circuit 103 includes a bulk supply vessel 102 that provides print material to a print material reservoir 104. Print material circulates through the bulk circulation circuit 103 from the print material reservoir 104 through a pump 106, a bulk circulation valve 108, and a check valve 110, and back to the print material reservoir 104. The check valve 110 is optional. By moving print material around bulk circulation circuit 103, the print material in the circulation circuit maintains a dispersed state. The print material reservoir 104 may include a mixing element (see, e.g., element 414 in FIG. 3A), making the print material reservoir 104 a mixed or stirred vessel.

The bulk circulation circuit 103 connects to the middle circulation circuit 105. The bulk circulation circuit 103 includes a bulk return line 101 from the check valve 110 to the print material reservoir. Print material flows from the print material reservoir 104 to the pump 106, to the bulk circulation valve 108, to the check valve 110, and back to the print material reservoir through the bulk return line 101 in a flow direction 103A. The middle circulation circuit 105 connects to the bulk circulation circuit 103 at the bulk return line 101. A bulk return valve 152 can be disposed in the bulk return line 101 to regulate flow from the middle circulation circuit 105 to the bulk circulation circuit 103.

The connection between the bulk circulation circuit 103 and the middle circulation circuit 105 is a bi-directional flow connection. Print material flows to and from the bulk and middle circulation circuits 103 and 105 through a connection line 109 that is bi-directional. The middle circulation circuit 105 includes a transfer valve 112 to regulate flow of the print material between the middle circulation circuit 105 and the bulk circulation circuit 103. The middle circulation circuit 105 has a flow direction 105A of print material around the circuit. The middle circulation circuit 105 includes an optional middle supply vessel 116 that connects to a middle supply valve 118 for controlling input of material from the middle supply vessel 116 to the middle circulation circuit 105. A middle circulation valve 120 regulates flow of print material in the middle circulation circuit 105. Print material flows through the middle circulation circuit 105 in a flow direction 105A from the middle circulation valve 120 to a phase purification module 121, and then to a valve 131, which regulates flow of print material from the middle circulation circuit 105 to a local circulation circuit 107, described further below. Print material flows back from the local circulation circuit 107 to the middle circulation circuit 105 through a middle return line 113, with a valve 127 disposed therein, to a middle pump 138. Discharge of the middle pump 138 flows through a middle check valve 140, and back along the flow direction 105A to the middle circulation valve 120. In some embodiments, valve 127 and valve 131 are part of a local circulation circuit 103 rather than part of middle circulation circuit 105. Valves of the present disclosure are digital valves, although analog-operated valves are also consistent with the subject matter of the present disclosure.

In some embodiments, the middle supply vessel 116 provides a flush material to remove print material from the middle and/or bulk and/or local circulation circuits 105, 103, and 107 such as during maintenance or when switching product types being printed by the inkjet printer. Thus, the middle supply vessel 116, supply valve 118, and middle circulation valve 120 can be part of a flushing module 114 of the middle circulation circuit 105. In other cases, the middle supply vessel 116 may be a print material supply vessel to supply print material to the middle and local circulation circuits 105 and 107. In either case, material can be transferred from the middle circulation circuit 105 to the local circulation circuit 107 and back, and from the middle circulation circuit 105 to the bulk circulation circuit 103 and back.

The phase purification module 121 includes a gas detector 122 and a gas remover 124. In some embodiments, the gas detector 122 is a bubble detection unit. In other cases, a chemical analyzer can be used to detect high vapor pressure species that have not formed bubbles. In some cases, a bubble detection unit performs optical observation of print material flowing through middle circulation circuit 105. In other cases, a bubble detection unit performs a capacitive measurement of the print material to determine presence of gas pockets or dissolved gases in the print material in the middle circulation circuit 105. The gas remover 124 may be a bubble collection unit, with a bubble collection volume to allow bubbles in the print material flow to collect in a vapor space of a print material reservoir and be removed from the print material flow path of the middle circulation circuit 105. In some cases, gas remover 124 is a gas extractor. An example of a gas remover that can be used is the pHasor® II module available from Entegris, Inc., of Billerica, Mass. Another example is the UltiFuzor™ model degasser available from Pall Corp. of Port Washington, N.Y. The gas remover 124 may include a filter, or a filter (not shown) may be coupled to an outlet of the gas remover 124, if desired.

The middle circulation circuit 103 includes an optional full recycle line 111 connected between the discharge side of the middle pump 138 and the suction side. Here, the full recirculation line 111 is connected at one end between the gas remover 124 and the local transfer valve 131, and at the other end between the valve 127 and the middle pump 138. The full recirculation line 111 provides the capability to recirculate print material in the middle circulation circuit 105 while isolating the middle circulation circuit 105 from the local circulation circuit 107. An optional full recycle valve 125 can be opened, and the local transfer valve 131 closed, to put the middle circulation circuit 105 in to full recycle mode. Full recycle mode allows for gas removal from print material in the middle circulation circuit 105 without flowing print material to the local circulation circuit 107. A middle bypass line 119 may be provided between the bulk circulation circuit 103 and the local circulation circuit 107 to bypass the middle circulation circuit 105 entirely and move print material directly from the bulk circulation circuit 103 to the local circulation circuit 107.

The local circulation circuit 107 provides print material to, and receives print material from, a print assembly of an inkjet printing device. As described further below, the print assembly may include one or more printheads that dispense print material during a print job. Opening the local transfer valve 131 allows print material to flow from the middle circulation circuit 105 into the local circulation circuit 107. The local circulation circuit 107 includes a feed reservoir 126 and a drain reservoir 134. The feed reservoir 126 is connected to the local transfer valve 131 by a local supply line 115, through which the feed reservoir 126 receives print material from middle circulation circuit 105. The feed reservoir 126 provides print material to printheads 128, 130, and 132 in a flow direction 107A through a print manifold 123. Here, three printheads are shown in the local circulation circuit, but any number of printheads may be used. Print material that has passed through one of the printheads 128, 130, and 132 without being dispensed onto a print substrate exits the printhead through print return manifold 129. Print material exiting the printheads collects in the drain reservoir 134 for return to the middle circulation circuit 105. Continuous circulation of print material through the local and middle circulation circuits 107 and 105 keeps the print material well-mixed so that solid components do not become mal-distributed.

A gas flow unit 133, which may be a gas source or a vacuum source, provides negative pressure, in this case, to feed reservoir 126 and/or drain reservoir 134 in order to move print material around the local circulation circuit 107, to move print material out of drain reservoir 134 and into middle circulation circuit 105, and/or to adjust a fill amount of print material in drain reservoir 134. An optional bypass line 135 is connected between the feed reservoir 126 and the drain reservoir 134 to provide a flow pathway to direct print material to the drain reservoir 134 without passing through the printheads 128, 130, and 132. A bypass valve 136 is disposed in the bypass line 135. When opened, the bypass valve 136 provides a direct flow path from the feed reservoir 126 to the drain reservoir 134, bypassing the printheads 128, 130, and 132. The gas flow unit 133 is generally configured to maintain a higher pressure in the feed reservoir 126 than in the drain reservoir 134 to promote flow of print material along the flow direction 107A, or from the feed reservoir 126 to the drain reservoir 134 when the bypass valve 136 is open. The liquid volume in the feed reservoir 126 is monitored by a first level sensor 142, and the liquid volume in the drain reservoir 134 is monitored by a second level sensor 144, to allow regulation of print material volume in the reservoirs and assure print supply to the print assembly when needed. The gas flow unit 133 is shown here as a single item, but multiple gas sources and/or vacuum sources can be used in any convenient configuration. In one example, the gas flow unit 133 includes 3 separate gas sources.

When a level sensor indicates that a quantity print material is too small in the feed reservoir 126, more print material is added to the feed reservoir 126 from the middle circulation circuit 105 by opening the local transfer valve 131. When a level sensor indicates that a quantity of print material is too small in the drain reservoir 134, print material may be transferred from the feed reservoir 126 to the drain reservoir 134 by opening the bypass valve 136. Alternately, flow of print material from the drain reservoir 134 can be controlled based on the liquid level in the drain reservoir 134 by adjusting the pumping rate, for example the pump speed, of the middle pump 138. According to some embodiments, a level sensor is applied to an outer surface of a vessel or reservoir and detects a quantity of print material therein by means of a capacitive detection unit against an outer surface of the vessel or reservoir. The capacitive level sensor is not wetted by the liquid in the vessel. Thus, a print material reservoir does not need to be optically transparent, but merely have sufficient wall thickness that the capacitive detector situated thereon interacts with the print material therein. Many capacitive level sensors can determine liquid level to an accuracy of 1 mm.

The pressure differential maintained by the gas flow unit 133 between the feed reservoir 126 and the drain reservoir 134 ensures print material flows from the feed reservoir 126 to the drain reservoir 134. The level sensors used herein can be analog or digital devices, each having strengths and weaknesses. Use of analog level sensors enables very accurate readout of liquid level and very fast control of liquid level, which can be useful in some embodiments. Level sensors can be internal to the vessels or external. Use of internal level sensors eliminates any effects of the vessel wall on the readings, while use of external sensors precludes chemical interaction of the materials of the level sensor with the liquid being monitored, and eliminates possible leak pathways. Furthermore, maintenance of the level sensors can be performed without opening the vessels.

The bulk circulation circuit 103, the middle circulation circuit 105, and the local circulation circuit 107 are configured to independently maintain movement of print material through the individual circulation circuits. For example, the bulk pump 106 is operable to add print material to the local circulation circuit 107 on a periodic or a continuous basis without affecting the movement of print material in the middle circulation circuit 105. Similarly, the valve 131 and valve 127 are operable to isolate the middle circulation circuit 105 from the local circulation circuit 107. The bulk transfer valve 112 may be a bi-directional valve that allows material to pass through the valve in both directions, from the bulk circulation circuit 103 into the middle circulation circuit 105, and from the middle circulation circuit 105 into the bulk circulation circuit 103. The bulk transfer valve 112, here, is also a three-way valve that can direct flow from the bulk circulation circuit 103 directly to the local transfer valve 131.

A controller 150 is operatively coupled to the valves 108, 112, 118, 120, 125, 127, 131, and 136, and to the gas flow unit 133, to control overall operation of the feed system 100. The controller 150 is also operatively coupled to the level sensors 142 and 144. The controller 150 is configured to control the volume of liquid in the feed reservoir 126 by adjusting (increasing) a pump speed while the valve 131 is open when the level sensor 144 indicates the liquid volume in the feed reservoir 126 is below a lower limit, and adjusting (decreasing) a pump speed while the valve 131 is open when the liquid volume is at or above an upper limit. Likewise, the controller 150 can be configured to control the volume of liquid in the drain reservoir 134 by opening the bypass valve 136 if the level sensor 142 indicates the liquid volume in the drain reservoir 134 is below a lower limit, and closing the bypass valve 136 if the liquid volume if above an upper limit. The controller 150 is also configured to control the gas flow unit 133 to maintain a higher pressure at an outlet of the feed reservoir 126 than at an inlet of the drain reservoir 134, across the printhead manifold. A velocity of print material through a printhead assembly is held at a constant velocity by adjusting pump velocity for print material in the local circulation circuit 107.

Figure 2:
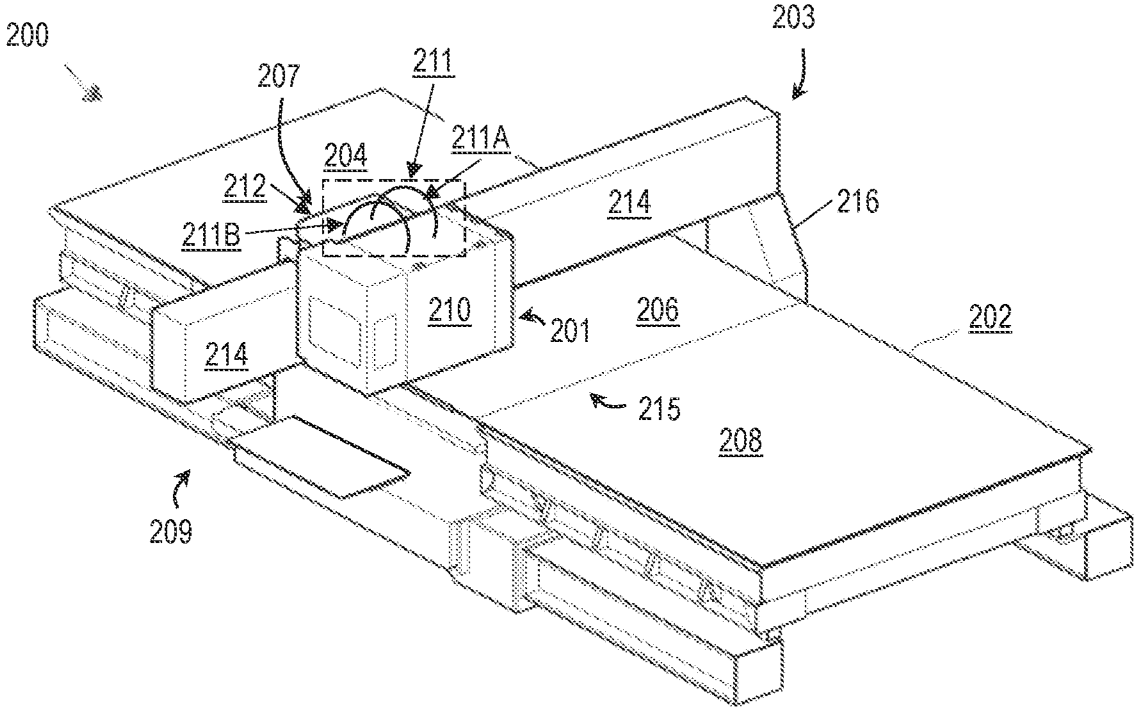
FIG. 2 is an isometric view of an inkjet printer, according to one embodiment.

FIG. 2 is an isometric view of an inkjet printer 200 according to one embodiment. Inkjet printer 200 includes a substrate support 202 on which a substrate is disposed for processing. The substrate support 202 generally provides a substantially frictionless support such that a substrate can be easily positioned and moved during processing. In this case, the substrate support 202 provides a gas cushion between the substrate support 202 and the substrate. In some cases, the substrate support 202 is monolithic. Here, the substrate support has a first region 204, a second region 206, and a third region 208, each of which has gas openings to provide the gas cushion. The first region 204 and third region 208 include one or more patterns of gas outlet openings that is different from a pattern of gas outlet openings in second region 206. The second region 206 defines a print zone 215 adjacent to a print assembly 209.

The print assembly comprises a dispenser assembly 201 and a print support assembly 203. The dispenser assembly 201 includes a printhead housing 210, a print material reservoir assembly 212, and a carriage 207. The print support assembly includes a rail 214 supported by stands 216 on either side of the substrate support 202. The carriage 207 supports the other components of the dispenser assembly 201 on the rail 214, and moves along the rail 214 to position the dispenser assembly 201 at target locations with respect to the print zone 215. The print material reservoir assembly 212 is connected to the printhead housing 210 by a circulation circuit 211, wherein a supply segment 211A of the circulation circuit 211 provides print material from a reservoir (not shown) inside the print material reservoir assembly 212, and a return segment 211B provides print material from the printhead housing 210 to the reservoir of the print material reservoir assembly 212. The printhead housing 210 houses one or more printheads with ejection nozzles that face the print zone 215. In some embodiments, return and supply segments of circulation circuit 211 are contained within the print material reservoir assembly 212 and/or the printhead housing 210. In some embodiments, return and supply segments of circulation circuit 211 are exposed outside of the print material reservoir assembly 212 and/or the printhead housing 210. By co-locating the print material reservoir assembly 212 and the printhead housing 210 in the dispenser assembly 201, circulation circuits for print material between the print material reservoir assembly 212 and the printhead housing 210 can be static. The gas source (not shown) for providing pressure to the circulation circuits for supplying the printhead housing 210 may also be included in the dispenser assembly 201.

Figure 3A:
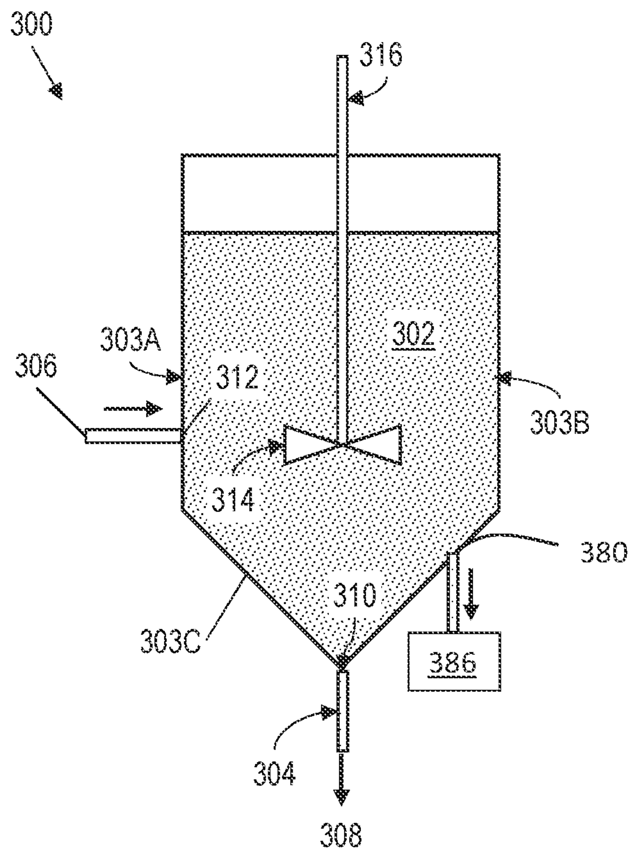
FIGS. 3A-3C are schematic diagrams of different embodiments of print material reservoirs.

FIG. 3A is a schematic diagram of a print material reservoir 300 according to one embodiment. The print material reservoir 300 includes sidewalls 303A and 303B configured to contain print material 302 (note that if the reservoir 300 is cylindrical, the sidewalls 303A and 303B will be one continuous cylindrical sidewall). The print material reservoir 300 can be used in a bulk circulation circuit such as the bulk circulation circuit 103 or the middle circulation circuit 105 described in connection with FIG. 1. An outlet 304 and an inlet 306 allow print material 302 to enter the circulation circuit (not shown in FIG. 3A). The outlet 304 is located at a bottom location 310 of print material reservoir 300. The inlet 306 is located in a side location 312 of the reservoir 300. The bottom 303C of the reservoir 300 may be sloped, and the bottom location 310 is at the bottom-most portion of the bottom 303C. A bypass outlet 380 may also be provided in the bottom 303C of the reservoir 300 to bypass the outlet 304, which generally carries print material from the reservoir 300 to the printheads (FIG. 1). Flow through the bypass outlet 380 may be controlled by a bypass valve 386, which may be the bypass valve 136 of FIG. 1.

The print material reservoir 300 further includes a mixing element 314 extending into the reservoir and driven by a mixing shaft 316. In some embodiments, mixing element 314 is a mixer blade, making the reservoir 300 a stirred vessel. In some instances, a mixing element is a jet mixer that draws material from the reservoir and returns the material to the reservoir at a high velocity to agitate the material of the reservoir. In some embodiments, mixing element 314 comprises multiple mixing surfaces fastened directly to mixing shaft 316. In some embodiments, a support piece (not shown) directly connects to the mixing shaft 316 and one or more mixing surfaces extend away from the support piece to agitate the print material within the print material reservoir 300. The reservoir 300 may also include static mixing elements such as wall baffles or vanes.

Figure 3B:
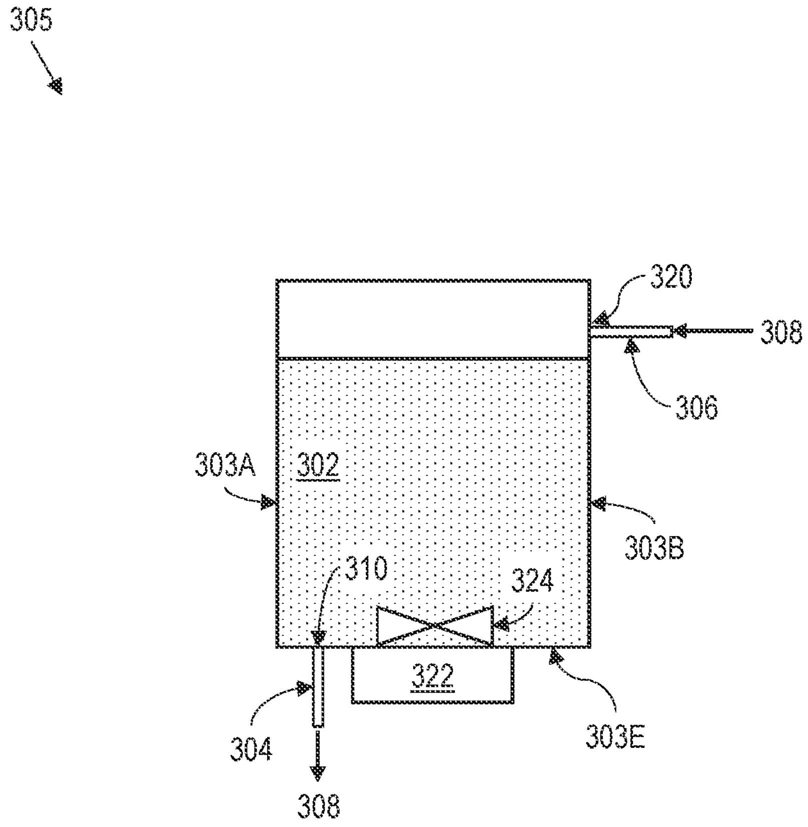

FIG. 3B is a schematic diagram of a print material reservoir 305 according to another embodiment. Structural elements indicated in FIG. 3B that resemble structural elements in other schematic diagrams of print material reservoirs are numbered identically. In print material reservoir 305, print material 302 is contained within sidewalls 303A and 303B (which may be one sidewall if cylindrical). The outlet 304 is located on bottom surface 303E, while inlet 306 is located on a sidewall 303B at a second location 320, or may also be located in the top of the vessel. In some embodiments, the second location 320 is located above a top surface of print material 302 within the print material reservoir 305. In some instances, the second location 320 is located below a top surface of the print material 302.

Print material reservoir 305 is configured with a magnetic stirrer 324 disposed within the reservoir. The magnetic stirrer 324 is adjacent to, or resting on, the bottom surface 303E of the reservoir and is moved by motive source 322, juxtaposed to the bottom surface 303E of the reservoir. The positions of the outlet 304 and the inlet 306 are situated on the sidewalls and or bottom of the reservoir in order to further promote mixing of print material within the reservoir.

Figure 3C:
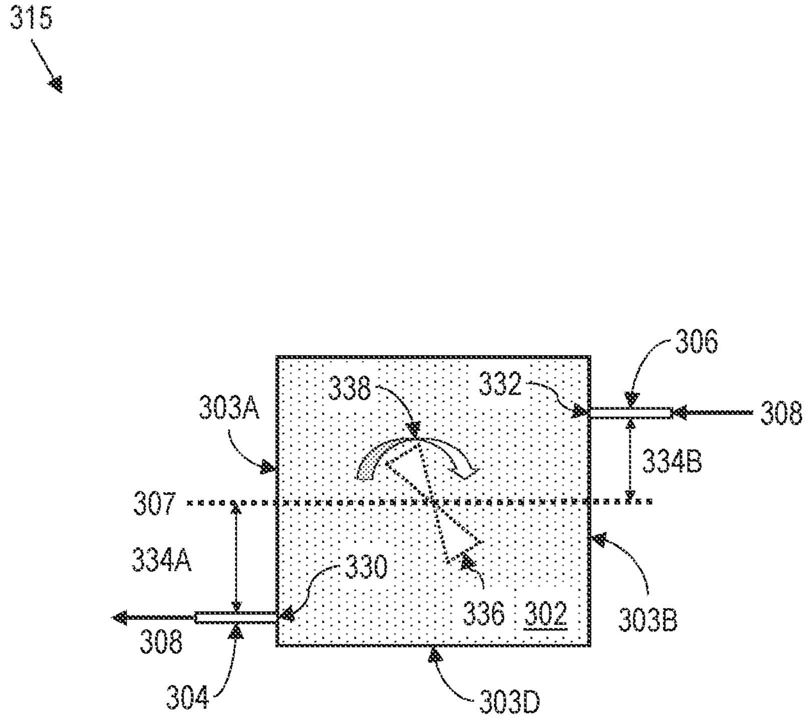

FIG. 3C is a top view of a print material reservoir 315 according to another embodiment. The outlet 304 is located on a sidewall 303 at first location 330, and inlet 306 is located on a sidewall 303B at second location 332. Sidewall 303A and sidewall 303B are separated from each other by sidewall 303D. Here, the print material reservoir 315 has a rectangular profile. The mixing element 336, rotating in a spin direction 338, is optionally included in some embodiments of print material reservoir 315. In some embodiments, the flow of print material in flow direction 308 from outlet 304 to inlet 306 is sufficiently large to generate mixing currents within the reservoir. Centerline 307 extends from a middle of sidewall 303A to a middle of sidewall 303B. Outlet 304 is a first distance 334A from centerline 307, and inlet 306 is a second distance 334B from centerline 307. In some instances, outlet 304 and inlet 306 are symmetrically positioned on sidewalls of the reservoir on opposite sides of centerline 307. In some embodiments, outlet 304 and inlet 306 are asymmetrically positioned on opposite sides of centerline 307. Whether the outlet 304 and the inlet 306 are symmetrically or asymmetrically positioned with respect to centerline 307 is a function of the flow rate of the print material through the circulation circuit (not shown), the temperature of the print material, and the viscosity of the print material. In some instances, print material reservoir is round, rather than rectangular (as shown) in order to reduce eddy currents or “dead spots” at corner locations of a rectangular print material reservoir. Eddy currents or “dead spots” are associated with volumes of print material with low velocity, where suspended particles in the print material can settle or separate from the fluid component of print material.

Figure 4:
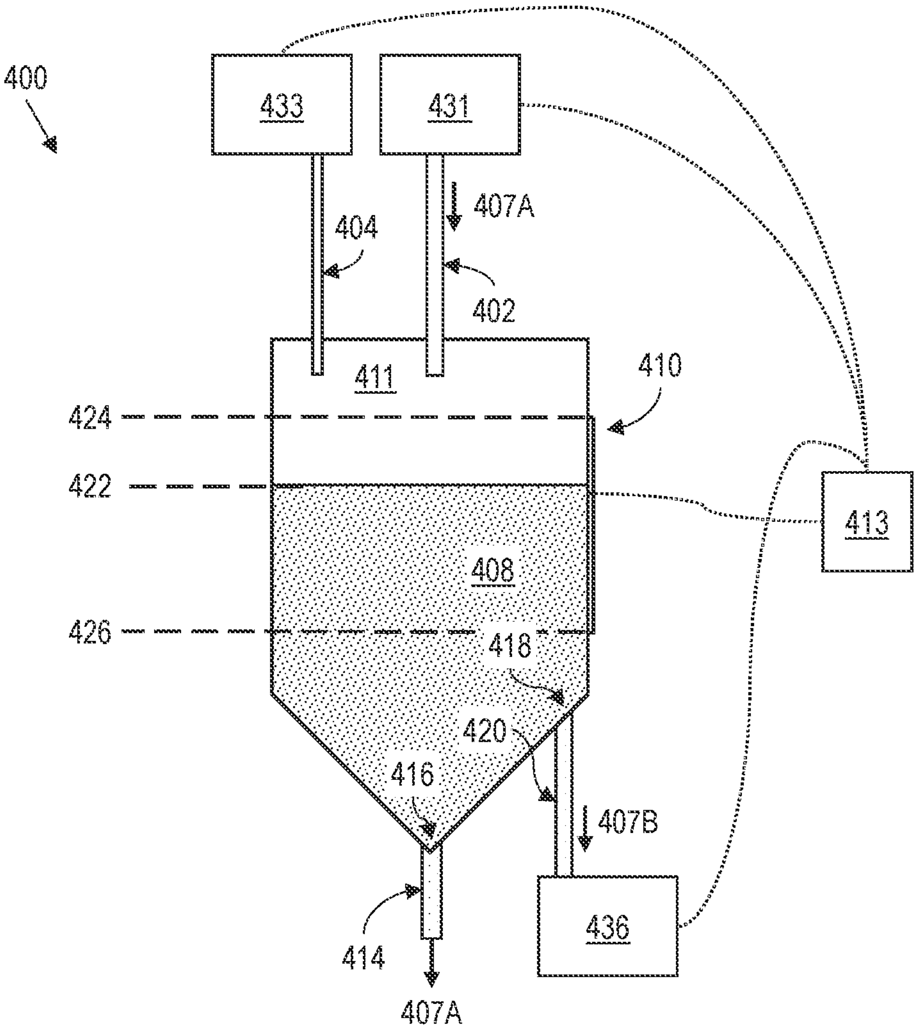
FIG. 4 is a schematic diagram of a supply reservoir according to one embodiment.

FIG. 4 is a schematic diagram of a supply reservoir 400 that can be used in a circulation circuit, according to one embodiment. The supply reservoir 400 can be used as the feed reservoir 126 described above in FIG. 1. The supply reservoir 400 has an inlet 402 configured to receive fluid, for example from the middle circulation circuit 105 of FIG. 1. When the supply reservoir 400 is used in a print material circulation circuit, print material entering the inlet 402 is mixed by circulation through the circulation circuit.

A fill level 422 of the print material 408 is maintained between an upper fill level 424 and a lower fill level 426 by a level sensor 410. Here, the level sensor is a capacitive sensor, but any level sensor can be used. The amount of print material 408 in the supply reservoir 400 is regulated by a fill regulator 413. Fill regulator 413 is connected to the level sensor 410 and valves 431, 433, and 436. Fill regulator 413 determines when the valves 431, 433, and 436 open and close in order to regulate addition of print material to the supply reservoir 400 through valve 531, the exit of print material from the supply reservoir 400 through opening 418 to flow line 420, and the addition of a pressurization gas, or application of vacuum, to a head space 411 in an upper region of the source reservoir. Pressurization gas enters, or gas exits, the supply reservoir 400 via a gas flow unit (not shown, but see gas flow unit 133 of FIG. 1) through line 404 to control pressure in the head space 411 of supply reservoir 400. In some embodiments, compressed air is used when positive pressure is desired. In other embodiments, vacuum is applied for negative pressure. In some instances, nitrogen can be used as a pressurization gas to reduce oxygen content of the print material prior to deposition on a print substrate from the printhead. Dissolved oxygen can have unwanted effects in some print materials. A pressurization gas is generally used that is not incompatible with the print material.

Head space 411 is the internal region of the supply reservoir 400 above the print material in the supply reservoir 400. Head space 411 includes at least the region within supply reservoir 400 above the upper fill level monitor 410, and includes the portion of the supply reservoir volume between the upper fill limit 424 and the lower fill limit 426. Pressurization gas is added to the supply reservoir 400 head space 411 to move print material 408 through a local circulation system, including the print heads, during an inkjet printing process. When valve 436 is in a closed position, as the pressurization gas is added to the supply reservoir 400, the fill limit 422 of the print material 408 decreases as the print material is forced out of opening 416 into circulation line 414 in flow direction 407A. When valve 436 is in an open position, as the pressurization gas is added to the supply reservoir 400, the fill limit 422 of the print material 408 decreases as the print material is forced out of opening 418 into circulation line 420 in flow direction 407B. Circulation line 414 is a printhead supply line. Circulation line 420 is a bypass line that goes around printheads and feeds directly into a drain reservoir (not shown, but see drain reservoir 134 of FIG. 1, above). A drain reservoir has a drain line that returns undeposited print material from drain reservoir to a middle circulation circuit. A drain reservoir is configured to receive print material from circulation line 414 connected to the printheads, and to receive print material from the circulation line 420 that bypasses the printheads.

Figure 5:
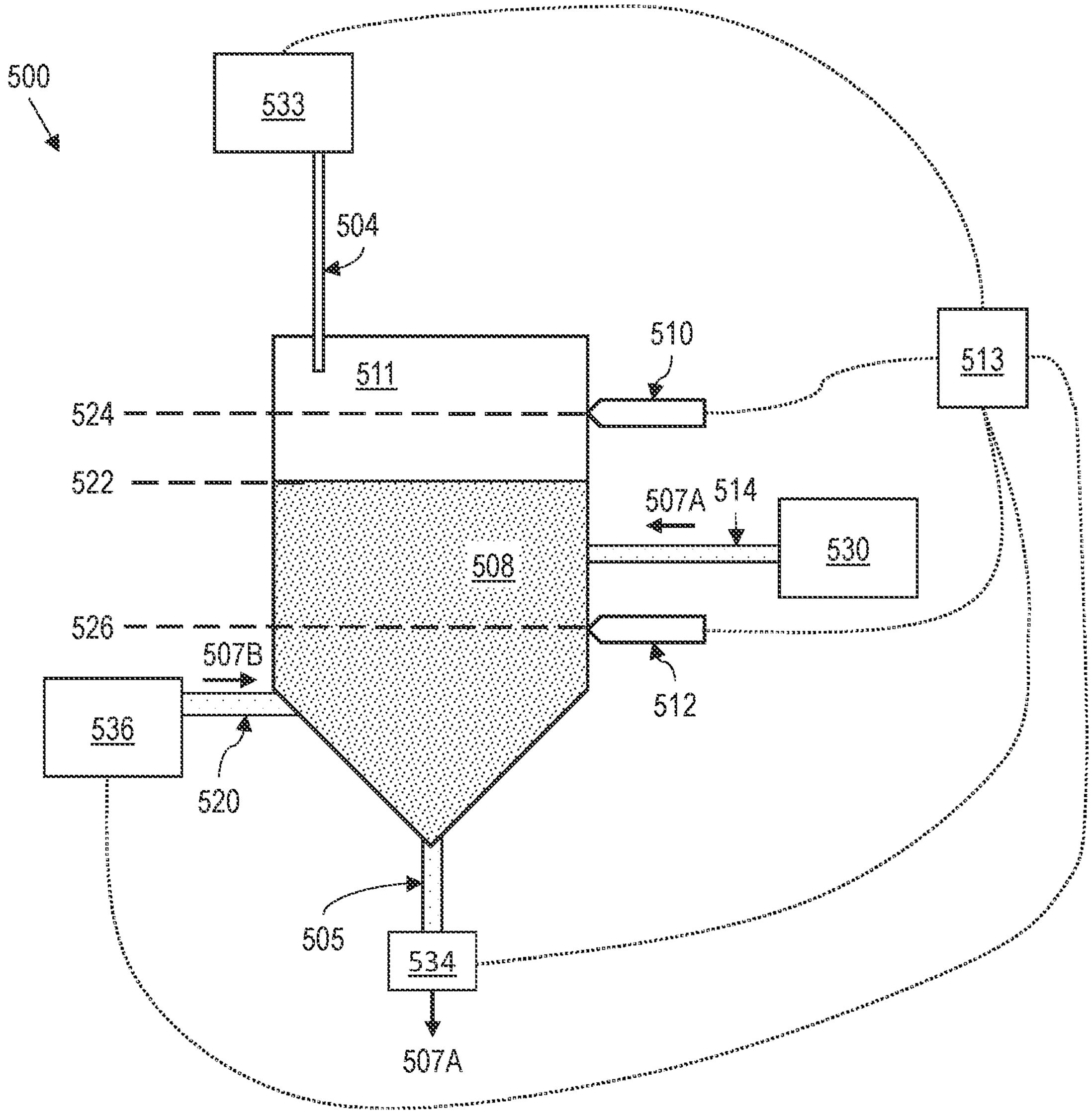
FIG. 5 is a schematic diagram of a drain reservoir according to another embodiment.

FIG. 5 is a schematic diagram of a drain reservoir 500 of a circulation circuit, in accordance with some embodiments. Drain reservoir 500 is connected to a pressurization source 533 by a pressurization line 504 that supplies a pressurization gas to a head space 511 above print material 508 in the drain reservoir 500. Drain reservoir 500 is configured to receive print material 508 in a flow direction 507B from a circulation line 520 that bypasses the print heads of the inkjet printing device and is regulated by a valve 536 (analogous to the bypass valve 136 of FIG. 1, or the valve 436 of FIG. 4). Flow direction 507B is a same direction as flow direction 407B in FIG. 4. Drain reservoir 500 is configured to receive print material 508 in a flow direction 507A from one or more printheads 530 by drain line 514. Flow direction 507A is a same flow direction as flow direction 407A in FIG. 4. Drain reservoir 500 is configured to evacuate print material through a drain line 505 coupled to a bottom location of the drain reservoir 500. A drain valve 534 can be disposed in the drain line 505 to control print material effluent from the drain reservoir 500.

A print material fill level 522 is maintained between an upper fill limit 524 and a lower fill limit 526 of the drain reservoir using fill level monitors 510, 512. Here, the fill level monitors 510 and 512 are pressure sensors, to illustrate another embodiment of usable level sensors. The same type of level sensor is typically used for the feed and drain reservoirs in the feed system 100 of FIG. 1. Fill level monitors 510, 512 are connected to a fill regulator 513 to indicate when print material exceeds the upper fill limit 524, or falls below lower fill limit 526. When the print material exceeds the upper fill limit 524, or falls below lower fill limit 526, fill regulator 513 triggers print material flow changes around the drain reservoir 500. When the print material level exceeds the upper fill limit 524, the fill regulation 513 can perform any combination of actuating the valve 533 to increase pressure in the head space 511, opening drain valve 534 to allow faster outflow of print material, and closing bypass valve 536 to flow more print material to the drain reservoir 500 can be performed. When print material level falls below lower fill limit 526, the fill regulator 513 can perform any combination of actuating valve 533 to lower pressure in the head space 511, closing drain valve 534, and opening bypass valve 536. Fill regulator 513 can monitor the print material fill level of both the supply reservoir and the drain reservoir in order to provide smooth flow of print material through printheads of the inkjet printing device during a printing process and/or a sufficient flow rate of print material through the local circulation circuit that contains the printheads to have the print material remain uniform, with no separation of liquid and/or suspended particles of the print material.

An inkjet printing device that includes a print material feed system containing a circulation circuit as described hereinabove maintains a mixed state of print material moving through the print material feed system by stirring or circulating the print material. Print material mixing is a relevant factor in the deposition of print material onto a print substrate for the manufacture of displays and screens for electronic devices. Displays that are printed with more uniform concentrations of print material have more uniform color and light intensity. Embodiments of print materials for displays and electronic device screens include chemical components for resins, quantum dots to convert incident light from a display light source into emitted light with a different wavelength than the incident light, and scattering particles. Quantum dots absorb incident light and convert the light to emitted light with a new wavelength. Scattering particles improve the efficiency of the quantum dots in absorbing and converting incident light to emitted light by reflecting incident light onto more sides of quantum dots than merely the sides facing the incident light source. Scattering particles redirect incident light onto the backs and sides of quantum dots (with respect to the direction of travel of the incident light), affording more surface area for light absorption and re-emission. Uniform concentrations of quantum dots and scattering particles increases the uniformity of light absorption and re-emission. Uniform concentration of quantum dots and scattering particles in a pixel and/or pixel sub-region is a function of the uniformity of print material circulating through the inkjet printer print head, or the print material feed system, during an inkjet printing process.

An inkjet printing device includes a print material feed system, as described above, and further includes a substrate support to support a print substrate during an inkjet printing process. Inkjet printing devices further include print substrate level sensors, print substrate position sensors, a motive source for moving a print substrate during an inkjet printing process, and at least one gripper to manipulate a print substrate during the inkjet printing process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An inkjet printing device, comprising:
a print assembly; and
a print material feed system coupled to the print assembly, the print material feed system comprising:
a first circulation circuit and a second circulation circuit, the first circulation circuit fluidly coupled between the second circulation circuit and the print assembly, the first circulation circuit comprising a supply reservoir, a drain reservoir, and a negative pressure gas flow unit coupled to the supply reservoir and the drain reservoir to control pressure in the supply reservoir and the drain reservoir, and further comprising a third circulation circuit fluidly coupled to the second circulation circuit and comprising a mixing element.

2. The device of claim 1, wherein the second circulation circuit comprises a gas extractor.

3. The device of claim 2, wherein the gas extractor comprises a jacketed porous tube.

4. The device of claim 2, wherein the supply reservoir and the drain reservoir are configured to maintain a higher pressure in the supply reservoir than in the drain reservoir.

5. The device of claim 4, further comprising a third circulation circuit fluidly coupled to the second circulation circuit and comprising a mixing element.

6. The device of claim 5, wherein the mixing element is a stirred vessel.

7. A print material feed system, comprising:
a first circulation circuit comprising:
a print material supply reservoir;
a print material drain reservoir;
a negative pressure gas flow unit coupled to the print material supply reservoir and to the print material drain reservoir;
at least one printhead;
a print material supply line fluidly coupled from the print material supply reservoir to the at least one printhead;
a print material return line fluidly coupled from the at least one printhead to the print material drain reservoir; and
a second circulation circuit comprising:
a circulation supply line coupled to the print material supply reservoir;
a circulation return line coupled to the print material drain reservoir; and
a pump that takes suction from the circulation return line and discharges to the circulation supply line.

8. The print material feed system of claim 7, wherein the second circulation circuit further comprises a gas extractor coupled into the circulation supply line.

9. The print material feed system of claim 8, further comprising a bypass line connecting the supply reservoir and the drain reservoir.

10. The print material feed system of claim 9, further comprising a level sensor coupled to each of the print material supply reservoir and the print material drain reservoir, a bypass valve in the bypass line, and a controller operatively coupled to the level sensors and configured to adjust a pressure difference between the print material supply reservoir and the print material drain reservoir a level detected by the print material drain reservoir level sensor.

11. The print material feed system of claim 10, further comprising a supply fill control valve in the circulation supply line, wherein the controller is operatively coupled to the supply fill control valve and further configured to adjust a flow a print material in the circulation supply line based on a level detected by the print material supply reservoir level.

12. The print material feed system of claim 10, wherein the controller is operatively coupled to the negative pressure gas flow unit and is further configured to maintain a higher pressure in the print material supply reservoir than in the print material drain reservoir.

13. The print material feed system of claim 12, further comprising a circulation return control valve in the circulation return line, wherein the controller is operatively coupled to the circulation return control valve and configured to control the circulation return control valve to set a fluid circulation rate in the second circulation circuit.

14. The print material feed system of claim 13, wherein the second circulation circuit further comprises a gas extractor and a circulation bypass line from the circulation supply line to the circulation return line.

15. The print material feed system of claim 14, wherein the second circulation circuit further comprises a print material source vessel fluidly coupled to the circulation supply line.

16. An inkjet printing device having a print material feed system, comprising:

a print assembly;
a bulk circulation circuit;
a middle circulation circuit; and
a local circulation circuit, wherein
the bulk circulation circuit is configured to draw print material from a supply vessel into a mixing vessel and to flow print material around the bulk circulation circuit continuously,
the middle circulation circuit is configured to draw print material from the bulk circulation circuit, to return print material to the bulk circulation circuit, and to flow print material around the middle circulation circuit, and
the local circulation circuit is configured to draw print material from and to return print material to the middle circulation circuit, and to supply print material to the print assembly.

17. The inkjet printing device of claim 16, further comprising a pressure control system to circulate print material through the local circulation circuit, and a circulation pump in each of the bulk circulation circuit and the middle circulation circuit.

18. The inkjet printing device of claim 17, wherein the local circulation circuit comprises a supply reservoir, a drain reservoir, a negative pressure gas flow unit coupled to the supply reservoir and the drain reservoir, and a bypass line connecting the supply reservoir to the drain reservoir, wherein the pressure control system is configured to maintain a higher pressure in the supply reservoir than in the drain reservoir.

19. The inkjet printing device of claim 16, wherein the local circulation circuit comprises a supply reservoir, a drain reservoir, a negative pressure gas flow unit coupled to the supply reservoir and the drain reservoir, and a controller configured to control the negative pressure gas flow unit to maintain a higher pressure at an outlet of the supply reservoir than at an inlet of the drain reservoir.

* * * * *